April 7, 1931.                    C. G. BUTLER                    1,799,279
                               GREASE GUN COUPLING
                               Filed March 26, 1928
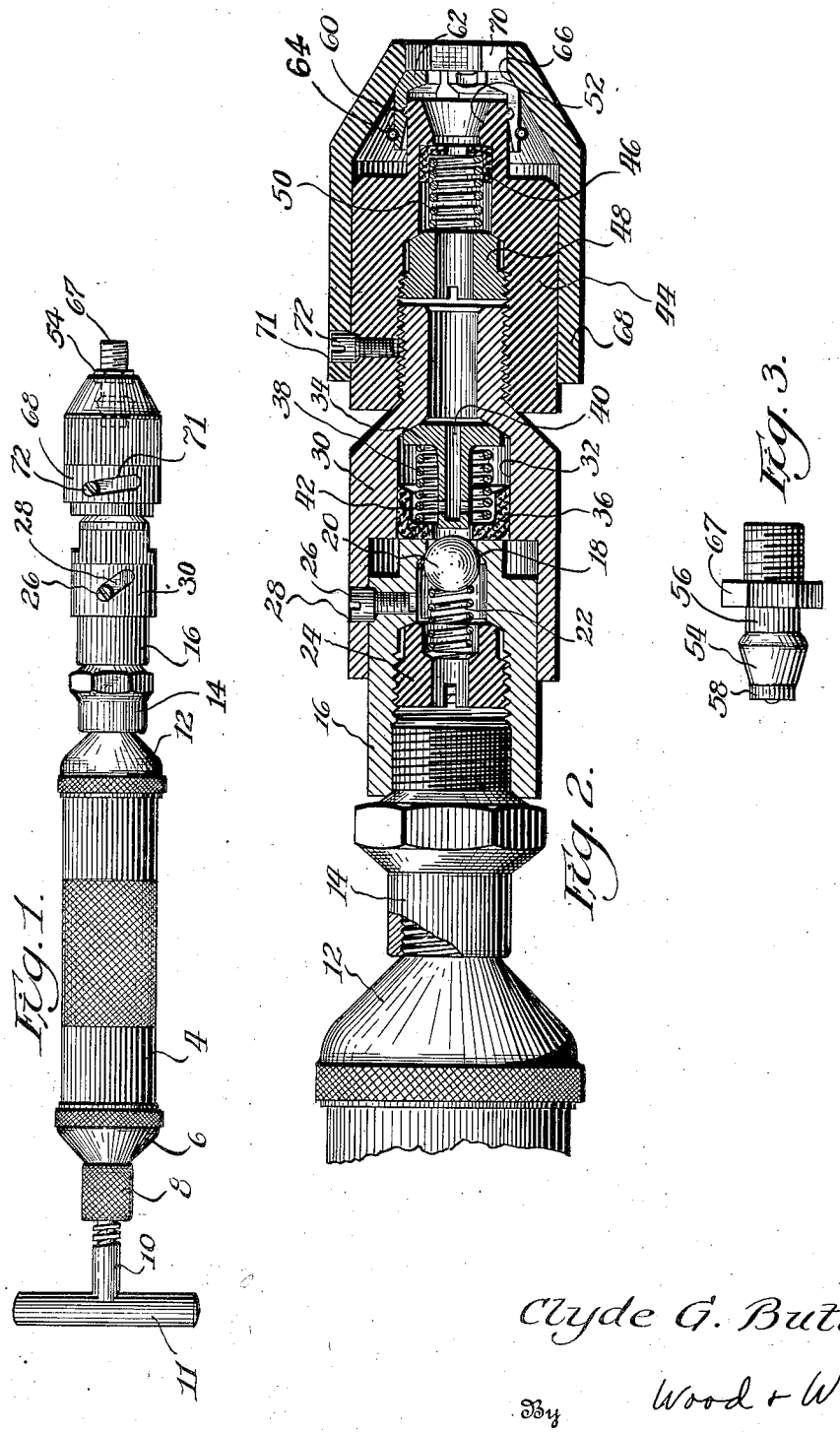
Inventor
Clyde G. Butler.
By   Wood & Wood
                              Attorney Patented Apr. 7, 1931

1,799,279

UNITED STATES PATENT OFFICE

CLYDE G. BUTLER, OF CINCINNATI, OHIO, ASSIGNOR, BY MESNE ASSIGNMENTS, TO ALEMITE CORPORATION, OF CHICAGO, ILLINOIS, A CORPORATION OF DELAWARE

GREASE-GUN COUPLING

Application filed March 26, 1928. Serial No. 264,733.

My invention relates to improvements in grease and oil gun nozzles and more particularly to nozzles of the valved type.

It is an object of my invention to provide an improved valved grease gun nozzle in which the valve is automatically actuated during the coupling and uncoupling operations.

A further object is to provide an improved valved coupling in which the connection and disconnection may be easily made with one hand only.

A further object is to provide a valved nozzle which is simple in construction and may be economically manufactured.

Other objects will appear from the following description, reference being had to the accompanying drawings, in which Fig. 1 is an elevation of a grease gun with my improved nozzle attached;

Fig. 2 is a vertical longitudinal section of the nozzle; and

Fig. 3 is an elevation of the lubricant-receiving nipple with which the nozzle is adapted to be connected.

In the operation of lubricating bearings under high pressure, using a portable hand-operated lubricant compressor or a conduit from a suitable mechanical or fluid-operated compressor, it is frequently desirable to permit the pressure to build up at the nozzle prior to the attachment of the nozzle to the fitting at the bearing to be lubricated and after the nozzle has been coupled to the fitting suddenly open a valve at the nozzle to permit an explosive charge of lubricant to be forced under high pressure into the fitting. Due to the presence of air in the lubricant, it is possible to build up sufficient pressure—even in a hand compressor of relatively small capacity—so that upon connecting the nozzle to the fitting at the bearing and opening the valve in the nozzle, a sufficient charge of lubricant will be forced into the fitting without making necessary the further operation of the compressor.

Referring to Fig. 1 of the drawings, the grease gun or compressor there illustrated comprises a barrel 4 having an outer cap 6 to which a knurled nut 8 is threaded. (For convenience, the word "outer" will be used to designate the leftward direction in the drawings.) A piston stem 10 is threaded in the nut 8 and at its inner end carries a suitable piston, which operates in the barrel 4, and at its outer end a suitable actuating handle 11. A cap 12 is threaded at the inner end of the barrel. This type of compressor is well known in the art and need not be described in greater detail.

The nozzle of my invention is attached to the cap 12 by a suitable union 14 which is threaded over the reduced end portion of the cap 12 and is also threaded for the attachment thereto of a body 16. This body is drilled and counterbored to form passageways for the lubricant and at its outer end has a valve seat 18.

A ball valve 20 is normally pressed against the seat 18 by a spring 22, the end of which seats upon an axially drilled retainer 24 which is threaded in the bore of the body 16. A fillister head cap screw 26 is threaded radially into the body 16, its head being slidable in a slot 28 formed in the valve operating sleeve 30. This sleeve is slidable and rotatable with respect to the body 16, within the limits prescribed by the movement of pin 26 in the slot 28. The sleeve 30 has an axially bored chamber 32 which houses a valve opening element 34 and a cup leather 36. A spring 38 is compressed between the element 34 and the cup leather 36, thus serving to hold the face of the cup leather in contact with the end of body 16 and to hold the valve opening element in position at the inner end of the chamber 32. The element 34 has an axial passage 40 extending substantially its entire length and a plurality of radial passages 42 communicating with the axial passage 40 adjacent the outer end thereof.

The inner end of the sleeve 30 is threaded to receive a coupling body 44, which is axially bored and counterbored to form a lubricant passage axially therethrough and to provide a bore to receive a cup leather sealing gasket 46 and a spring retainer 48. A spring 50 is compressed between the cup leather 46 and the retainer 48.

The outer end of the body 44 has a frusto-conical recess 52 which is adapted to fit over the head portion 54 of a lubricant-receiving fitting 56. The fitting also has a cylindrical end tip 58 which is adapted to project into the inner end of the frusto-conical recess 52 and contact with the sealing gasket 46. The outer end of the body 44 is of reduced external diameter and has an annular rib 60 near its extremity.

The rib 60 forms a fulcrum for a plurality of jaws 62 which have grooves complementary to the rib 60. These jaws are normally held with their inner ends spread apart by a toroidal tension spring 64 which encompasses their outer ends and fits in suitable grooves formed therein. The jaws are beveled at their outer edges so as to conform to the shape of a frusto-conical camming surface 66 formed on the inside of a coupling sleeve 68. The outer end of this sleeve has a hexagonal opening 70 which is adapted to receive the hexagonal coupling flange 67 formed on the fittting 56. The sleeve 68 has a slightly oblique circumferential slot 71 formed near its outer end. A fillister head cap screw 72 has its head projecting into the slot 71 and is threaded in the coupling body 44.

The operation of the above described valved nozzle is as follows. With the coupling sleeve 68 and the valve operating sleeve 30 in the positions as shown in Fig. 1, the inner ends of the jaws 66 will be spread apart (due to the tension of the spring 64) and the valve mechanism will be in the position as shown in section in Fig. 2. With the jaws 62 spread apart the compressor may be applied to a fitting 56, since the enlarged portion 54 of the fitting will readily pass between the jaws until the coupling flange 67 lies within the hexagonal opening 70 in the end of the coupling sleeve 68. At this time the cylindrical end portion 58 of the fitting will have come in contact with the face of the cup leather 46 and will have moved it backwardly against the force of spring 50. After thus placing the nozzle over the fitting, the operator will rotate the compressor barrel, preferably by means of the handle on the stem 10.

Since the coupling sleeve 68 is prevented from rotating by the flange 67, the screw 72 will, through engagement with the cam slot 70, draw the coupling body 44 toward the fitting thereby causing the jaws to engage the frusto-conical camming surface 66 of the sleeve 68 and force the jaws inwardly behind the enlarged portion 54 of the fitting, thus firmly clamping the coupling jaws over the fitting.

Further rotation of the compressor will cause the body 16 to rotate with respect to the sleeve 30 and through the screw 26 and slot 27 draw the body inwardly against the force of spring 38 until the end of the element 34 contacts with and raises the ball valve 20 from its seat 18, thus permitting lubricant to be forced from the compressor into the fitting. If the compressor has been previously operated to place the lubricant therein under pressure, opening the valve 20 will permit a sudden explosive charge of lubricant to be forced into the fitting. After sufficient lubricant has been forced into the fitting and hence to the bearing to be lubricated, the compressor is rotated counterclockwise and the body 16 permitted to rotate with respect to sleeve 30, thus bringing the screw 26 to the end of the slot 28 as shown in Fig. 1. Continued rotation of the compressor will cause the body 44 to rotate with respect to the sleeve 68 until the screw 72 abuts against the end of its slot 70. With the sleeve 68 and body 44 in this relative position, the clamping jaws 62 are separated by spring 64, permitting the compressor and nozzle to be withdrawn from the fitting.

It will be noted that the slots 70 and 28 are at different angles so that upon rotation of the compressor the coupling operation will be effected first due to the lesser slope of the slot 70.

Similarly, upon the uncoupling operation the valve will be closed before the uncoupling operation takes place due to the fact that lubricant pressure within the chamber 72, augmented by the force of the spring 38, will tend to force the body 16 and sleeve 30 apart. If, however, there is no pressure upon the lubricant within the chamber 32, it is possible that the sleeve 68 may be rotated with respect to the coupling body 44 before the sleeve 30 rotates with respect to the valve body 16, but in this event, the sequence of the operation of the closing of the valve and the uncoupling is of no consequence because no lubricant would leak from between the recess 52 and the fitting because of this lack of lubricant pressure. Of course, if desired, the proper sequence of operations in uncoupling may be obtained under all conditions merely by holding the sleeve 30 against rotation until the valve has closed, or by pulling outwardly on the grease gun as it is being rotated counterclockwise during the first phase of the uncoupling operation.

While I have shown and described a particular embodiment of my invention, I am aware that other modifications thereof may be made without departure from the underlying principles. I therefore desire the scope of my invention to be limited only by the claims which follow.

I claim:—

1. In lubricating apparatus, the combination of a lubricant-receiving fitting, a high pressure grease gun, an apertured body secured to the discharge end thereof, a spring pressed ball check valve normally closing the aperture in said body, a sleeve swiveled on said body, a valve opening element in said sleeve and normally spaced from said valve, a cup leather engaging the end of said body and the inner wall of said sleeve, a spring compressed between said cup leather and said element, cooperating cam means on said body and said sleeve operative upon relative rotative movement to move said sleeve axially with respect to said body thereby to force said element to contact with and open said valve, and means operative upon rotative movement of said gun with respect to said fitting to make a sealed connection with said fitting, the operation of said last-named means requiring a lesser turning moment than that required to open said valve.

2. In apparatus of the class described, the combination of a lubricant-receiving fitting, a grease gun, an apertured body secured to the discharge end thereof, said body having a cylindrical projection at the outer end thereof, a spring pressed check valve normally closing the aperture in said body, a sleeve having limited axial and rotative movement relative to said body and having a bore to receive the projection thereof, a valve opening element in said sleeve, a cup leather engaging the end of said projection and the inner wall of the bore in said sleeve, a spring for holding said cup leather and said element in position, cooperating cam means on said body and said sleeve for moving said sleeve axially with respect to said body thereby to force said element to contact with and open said valve, and means operative upon rotative movement of said gun with respect to said fitting to make a sealed connection with said fitting, the operation of said means requiring a lesser turning moment that that required to open said valve.

3. In lubricating apparatus of the class described, the combination of a lubricant-receiving fitting, a lubricant compressor, a spring pressed ball check valve at the discharge outlet of said compressor, a sleeve around said discharge outlet, an element therein adapted to engage and open said valve upon relative movement of said sleeve and compressor, and unitary coupling means secured to the discharge outlet of said compressor for connecting said compressor to said fitting, said last named means comprising cooperating pins and cam slots operative to couple said compressor with said fitting.

4. In lubricating apparatus of the class described, the combination of a lubricant-receiving fitting, a lubricant compressor, a valve at the discharge outlet of said compressor, a coupling sleeve for connecting said compressor to said fitting, interengaging means on said fitting and sleeve to prevent relative rotation therebetween, means comprising a cooperating pin and cam slot operative to couple said compressor with said fitting, a valve engaging element, a second pin and cam slot connection operative to open said valve subsequent to said coupling operation, and two springs, one normally holding said valve closed, and the other normally holding said element away from said valve.

5. In apparatus of the class described, the combination of a lubricant compressor, a valve body secured at the discharge end thereof, a spring pressed ball valve in said body and normally preventing discharge of lubricant, a sleeve having a cam slot formed therein and axially slidable and rotatable with respect to said body, a pin rigid with said body and extending into said cam slot, means carried within said sleeve and operative upon rotation of said sleeve with respect to said body to open said valve, a spring tending to prevent relative rotation of said sleeve and body, and unitary means secured to the end of said sleeve and adapted to make a quick detachable connection with a lubricant-receiving fitting connected to said sleeve.

6. In lubricating apparatus, the combination of a lubricant-receiving fitting, a high pressure grease gun, an apertured body secured to the discharge end thereof, a spring pressed inwardly opening valve normally closing the aperture in said body, a sleeve swiveled on said body, an apertured substantially tubular valve-opening element within said sleeve and normally spaced from said valve, a cup leather engaging the end of said body and the inner wall of said sleeve, a spring compressed between said cup leather and said element and serving to hold said element and cup leather in position in said sleeve, cooperating pin and cam slot means on said body and said sleeve for moving said sleeve axially with respect to said body thereby to force said element to contact with the open said valve, and unitary means secured to the end of said sleeve and operative upon rotative movement of said gun with respect to said fitting to make a sealed connection with said fitting, the operation of said last-named means requiring a lesser turning movement than that required to open said valve.

In witness whereof, I hereunto subscribe my name this 22nd day of March, 1928.

CLYDE. G. BUTLER.